(12) United States Patent
Feltner et al.

(10) Patent No.: US 6,515,997 B1
(45) Date of Patent: Feb. 4, 2003

(54) METHOD AND SYSTEM FOR AUTOMATIC CONFIGURATION OF A GATEWAY TRANSLATION FUNCTION

(75) Inventors: Chuck Feltner, Plano, TX (US); Miguel-Angel Garcia, Madrid (ES)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/315,360

(22) Filed: May 17, 1999

(51) Int. Cl.$^7$ .............................................. H04L 12/28
(52) U.S. Cl. ..................... 370/401; 370/352; 370/353; 370/354; 370/355; 370/356; 370/410; 370/465; 379/229; 379/230; 455/426; 455/432; 455/433; 455/456; 455/461; 455/552
(58) Field of Search ................................. 370/352, 353, 370/354, 338, 355, 356, 349, 401, 410, 466–467, 522, 389, 392, 524; 379/229, 230; 455/426, 432, 456, 433, 461, 552, 435

(56) References Cited

U.S. PATENT DOCUMENTS

| | | | |
|---|---|---|---|
| 5,852,660 A * | 12/1998 | Lindquist et al. ........... | 370/401 |
| 5,867,788 A * | 2/1999 | Joensuu ....................... | 379/219 |
| 5,878,347 A * | 3/1999 | Joensuu et al. .............. | 455/432 |
| 5,901,352 A * | 5/1999 | St-Pierre et al. ............. | 455/426 |
| 5,933,784 A * | 8/1999 | Gallagher et al. ........... | 370/401 |
| 6,005,845 A * | 12/1999 | Svennesson et al. ........ | 370/260 |
| 6,044,142 A * | 3/2000 | Hammarstrom et al. ...................... | 379/201.01 |
| 6,047,194 A * | 4/2000 | Andersson ................... | 370/329 |
| 6,094,578 A * | 7/2000 | Purcell et al. ............... | 455/426 |
| 6,219,548 B1 * | 4/2001 | Feltner et al. ............... | 455/403 |
| 6,308,267 B1 * | 10/2001 | Gremmelmaier ............ | 370/329 |
| 6,317,421 B1 * | 11/2001 | Wilhelmsson et al. ...... | 370/328 |
| 6,324,183 B1 * | 11/2001 | Miller et al. ................. | 370/467 |
| 6,327,267 B1 * | 12/2001 | Valentine et al. ............ | 370/355 |
| 6,353,607 B1 * | 3/2002 | Valentine et al. ............ | 370/349 |
| 6,353,621 B1 * | 3/2002 | Boland et al. ............... | 370/328 |
| 6,356,761 B1 * | 3/2002 | Huttunen et al. ............ | 455/414 |

* cited by examiner

Primary Examiner—Douglas Olms

(57) ABSTRACT

A system (100) and method (140) for facilitating automatic translation of signals between a Public Land Mobile Network (PLMN) (104) and an Internet Protocol (IP)-based network (102) in a communications system (100) having a gateway (108) providing an exchange mechanism between the PLMN (104) and the IP-based network (102). The IP-based network (102) contains a Network Access Controller (NAC) (106) configured to communicate with the gateway (108). The method includes the steps of provisioning IP address and port number identifiers of the gateway within the NAC (142) and sending a registration message (124) from the NAC to the gateway (146), where the registration message (124) contains the IP address and port information of nodes within the IP-based network (102). The information in the registration message (124) is used to update a translation function (128) within the gateway (108).

25 Claims, 4 Drawing Sheets

METHOD AND SYSTEM FOR AUTOMATIC CONFIGURATION OF A GATEWAY TRANSLATION FUNCTION

TECHNICAL FIELD

The present invention relates generally to internetworking within a telecommunications system and more specifically to facilitating translation of signals between a Public Land Mobile Network (PLMN) and an IP-based network.

BACKGROUND OF THE INVENTION

Wireless communication technology has experienced unprecedented growth, fueled by advances in radio frequency, satellite, and microelectronic technologies and by the convenience of access to telephony and portable cellular devices. A common architecture for wireless communication is the Global System for Mobile Communications (GSM) which is a protocol standard defined by the Conference of European Posts and Telegraphs (CEPT) for use in digital land mobile radio networks.

Likewise, the Internet has become a popular tool for sending and receiving information. In essence, the Internet comprises a worldwide network of communications equipment and service providers which use a common protocol for communicating. On the Internet, messages are transmitted from one user to another over a vast infrastructure of routers, servers, gateways and other similar devices. Typically, users on either end of the network operate computers equipped with appropriate software, devices and other components. Examples of such components include a modem and Internet browser application. Often, a user establishes a connection to the Internet through an Internet Service Provider (ISP). The underlying link level protocols stacks handle the messaging functions on both ends of the channel. Transmission Control Protocol/Internet Protocol (TCP/IP) is a connection standard developed by the U.S. Department of Defense in the 1970s that is utilized for IP-based networks. TCP governs the exchange of sequential data, while IP routes outgoing and recognizes incoming messages. Other protocols such as User Datagram Protocol (UDP), a connectionless protocol, are used to send information from one application to another on the Internet.

The widespread use of the Internet as a communications tool has led to an intense push for the integration of Internet services with other networks such as cellular networks including GSM. While IP networks communicate using TCP/IP connections, cellular networks utilize common channel signaling system number 7 (SS7 or C7), a global standard for telecommunications defined by the International Telecommunication Union (ITU) and specifically the Telecommunications Standardization Section of the ITU (ITU-T). The SS7 standard defines the procedures and protocols by which network elements in the public switch telephone network (PSTN) exchange information over a digital signaling network including wireless, e.g. cellular, and wireline call setup, routing and control. The ITU definition of SS7 allows for variance of the procedures and protocols such as those promulgated by the American National Standards Institute (ANSI) and Bell Communications Research (Bellcore) standards used in North America as well as the European Telecommunication Standards Institute (ETSI) standards used in Europe.

Essentially, an SS7 network and the defined protocols are used for implementing call signaling functions including basic call setup management and tear down. In addition, SS7 specifies various wireless services such as personal communication services (PCS), wireless roaming and mobile subscription authentication. Most recently, the SS7 protocol has been used for local number portability (LNP) as well as toll free and toll wireline services. Other services that benefit from the SS7 protocol include enhanced called features such as call forwarding, calling party name and number display and three way calling as well as a wide array of emerging applications standards that provide for efficient and secure worldwide telecommunication.

With an SS7 network, messages are exchanged between network elements over 56 or 64 kilobits per second (kbps) using bi-directional channels called signaling links. Signaling occurs out-of-band on dedicated channels rather than in-band on voice channels. Compared to in-band signaling, out-of-band signaling provides faster call setup times, more efficient use of voice circuits, and support for intelligent network services which require signaling to network elements without voice trunks. In addition, out-of-band provides for improved control over fraudulent network use. These advantages have made the SS7 protocol a popular choice for internetworking with voice over Internet Protocol (IP) applications including IP telephony.

The hardware and software functions of the SS7 protocol are divided into functional abstractions called levels. These levels map loosely to the Open Systems Interconnect (OSI) 7-layer model defined by the International Standards Organization (ISO). An ISDN user part (ISUP) defines the protocol used to setup, manage and release trunk circuits that carry voice data between terminating line exchanges, e.g., between a calling party and a called party.

The internetworking of IP networks with wireless networks such as the PLMN poses a challenge, because of the different communication protocols used. A function is required to translate IP address and TCP/UDP port number information from IP networks to SS7 information of a PLMN, and vice versa. Currently, when a serving or routing node such as a Network Access Controller (NAC) is added to an IP network, the translational information for facilitating communication between the IP-based networks and PLMNs must be configured manually within an IP-SS7 gateway. Such manual configuration is time-consuming, cost ineffective and prone to introduce errors.

SUMMARY OF THE INVENTION

The present invention provides a method and system for automatic configuration of a gateway translation function between an IP network and a PLMN. Upon system start-up or upon the addition of a NAC to an IP network, the NAC provisions the IP address and port number information of an associated IP-SS7 gateway that provides a link to the PLMN. The NAC establishes a connection with the IP-SS7 gateway and sends a registration message having IP address and port number information to the IP-SS7 gateway. The IP-SS7 gateway uses the information in the registration message to update its translation function, correlating the IP address and port number information to a numbering plan and digit string within the PLMN.

In one embodiment, disclosed is a method of facilitating automatic translation of signals between a PLMN and an IP-based network in a communications system having a gateway providing an exchange mechanism between the PLMN and the IP-based network. The IP-based network contains a Network Access Controller (NAC) configured to communicate with the gateway. The method comprises the steps of provisioning IP address and port number identifiers of the gateway within the NAC and sending a registration message from the NAC to the gateway, where the registration message contains the IP address and port information of nodes within the IP-based network.

In another embodiment, disclosed is a system for facilitating automatic translation of signals between a PLMN and a IP-based network. The system includes a gateway providing an exchange mechanism between the PLMN and the IP-based network, and a Network Access Controller (NAC) within the IP-based network providing signal control functions for a plurality of subscribers. The NAC is configured to provision IP address and port number identifiers of the gateway and send a registration message from the NAC to the gateway. The registration message contains the IP address and port information of nodes within the IP-based network.

BRIEF DESCRIPTION OF THE DRAWINGS

The above features of the present invention will be more clearly understood from consideration of the following detailed description in connection with the accompanying drawings in which.

Corresponding numerals and symbols in the different figures refer to corresponding parts unless otherwise indicated.

DETAILED DESCRIPTION OF PREFERRED EMBODIMENTS

Figure 1:
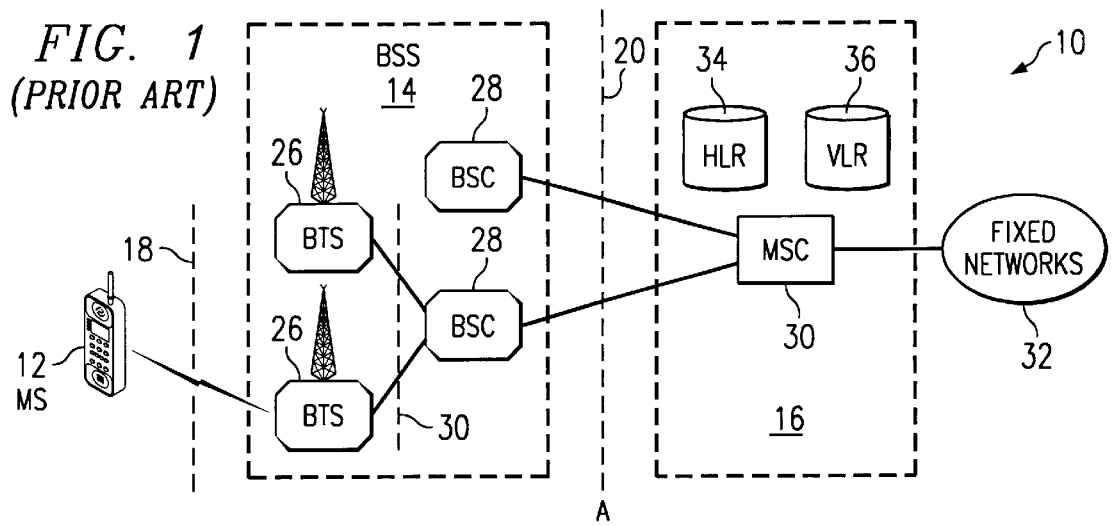
FIG. 1 illustrates a GSM network 10 of the prior art.

With reference to FIG. 1, therein is shown an example architecture for a network utilizing the Global System for Mobile Communications (GSM) standard which is the protocol defined by the Conference of European Posts and Telegraphs (CEPT) for use in digital land mobile radio networks. A layout of a generic GSM network 10 is typically comprised of three main parts: a mobile handset 12, a Base Station Subsystem (BSS) 14, and network subsystem 16.

Mobile handset 12 is typically a cellular telephone that is carried by the subscriber, although other terminal devices such as lap-top computers or fax machines may be used to communicate information over the GSM network 10. The network subsystem 16, the main part of which is the Mobile Switching Center (MSC) 30, performs the switching of calls between the mobile user and other fixed or mobile network users, as well as mobility management. The mobile handset 12 and the BSS 14 communicate with one another across the Um interface 18, also known as the air interface or radio link, which is controlled by the BSS 14. The BSS 14 communicates with the MSC 30 of network subsystem 16 across an A-interface 20.

The Base Station Subsystem (BSS) 14 comprises two parts: the Base Transceiver Station (BTS) 26 and the Base Station Controller (BSC) 28. BTS 26 communicates across the standardized Abis interface 30 with BSC 28, allowing operation between components. BTS 26 houses radio transceivers that define a cell and handles the radio-link protocols with the mobile handset 12. In a large urban area, there may be a large number of BTSs 26 deployed. BSC 28 manages the radio resources for one or more BTSs 26, and, as such, there may be several BSCs 28 within a single BSS 14. Among the functions of the BSC 28 are radio-channel setup, frequency hopping, and handovers. BSC 28 provides a connection mechanism between the mobile handset 12 and the MSC 30 of network subsystem 16 which acts as the interface to one or more fixed networks 32.

The central component of the network subsystem 16 is the MSC 30, which acts like a normal switching node of the Public Switched Telephone Network (PSTN), and provides all the functionality needed to handle a mobile subscriber, such as registration, authentication, location updating, handovers, and call routing to roaming subscribers. These functions are provided in conjunction with several other network entities, which together form the network subsystem 16. The MSC 30 provides the connection mechanism to the fixed networks 32 which may include the PSTN or an Integrated Service Digital Network (ISDN), for example. The Home Location Register (HLR) 34 and Visitor Location Register (VLR) 36, together with the MSC 30, provide call routing and roaming capabilities for the GSM network 10. In particular, the HLR 34 contains administrative information of the subscriber registered in the corresponding GSM network 10, along with the current location of the mobile handset 12. Likewise, the VLR 36 contains selected administrative information from HLR 34 necessary for call control and provisioning of the subscriber services for each mobile currently located in the geographical area controlled by the VLR 36. Other registers are used for authentication and security functions within the network subsystem 16.

Figure 2:
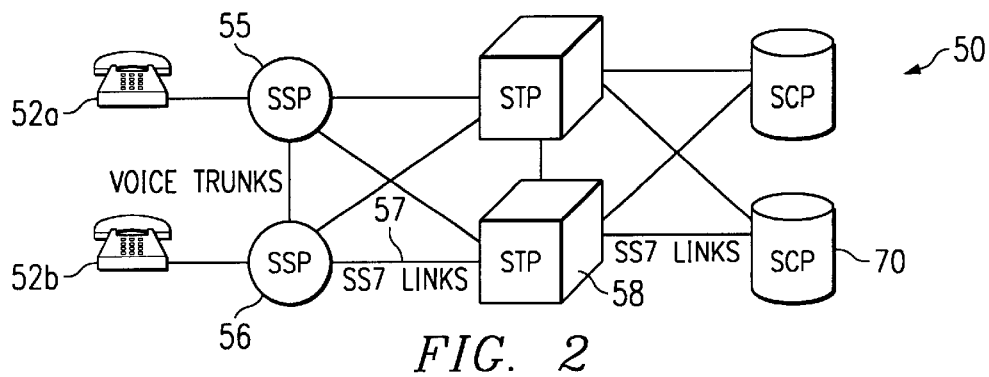
FIG. 2 illustrates the arrangement of signaling points within an SS7 network of the prior art.

The most widely used connection mechanism between the MSC 30 to the fixed networks 32 is Signaling System No. 7 (SS7), a common channel signaling protocol for connections between interconnected networks. SS7 is used to interconnect most of the cellular MSCs 30 throughout the U.S., and is a key factor in enabling autonomous registration and automated roaming in cellular systems. FIG. 2 is a model of a typical SS7 network, denoted generally as 50, comprising a plurality of signaling links and signaling points. Specifically, Plain Old Telephone System (POTS) 52a, 52b are coupled to corresponding Service Switch Points (SSP) 55 and 56. Like other signaling points within the network 50, the SSPs 55 and 56 are uniquely identified by a numeric point code. Numeric point codes are carried in signaling messages exchanged between signaling points to identify the source and destination of each message. Each signaling point uses a routing table to select the appropriate signaling path for each message.

The SSPs 55, 56 are switches that originally terminate as tandem calls. An individual SSP sends signaling messages to other SSPs required to setup, manage and release voice circuits required to complete a call. An SSP may also send a query message to a centralized data base such as the Service Control Point (SCP) 70 to determine how to route a call, e.g., a toll free number calling North America. The SCP 70 sends a response to the originating SSP 56, for example, containing the routing numbers associated with a dialed number. An alternate routing number may be used by the SSP 56 if the primary number is busy or the call is unanswered within a specified time. Actual call features vary from network to network and from service to service.

Network traffic between signaling points may be routed via a package switch called a signal transfer point (STP) 58. The SSP 56 is coupled to the STP 58 through one or more SS7 links 57. An operation of the STP 58 routes each incoming message to an ongoing signaling link based on routing information contained in the SS7 message. Because the STP 58 acts as a network hub, the STP 58 provides improved utilization of the SS7 network 50 by eliminating the need for direct links between signaling points. An STP 58 may perform global title translation, a procedure by which a destination signaling point is determined from digits present in the signaling message. Likewise, the STP 58 can act as a fire wall to screen SS7 messages exchanged with other networks.

Because the SS7 network 50 is critical to call processing, the STP 56 and STP 58 are usually deployed in mated pair configurations as shown in FIG. 2. Typically, pairs of elements are located in separate physical locations to assure network wide service in the event of an isolated failure. The links 57 between signaling points 56, 58 can also be provisioned in pairs. Traffic is shared across all links in the link set and if one of the links fails the signaling traffic is rerouted over another link in the link set. The SS7 protocol provides both error correction and retransmission capabilities to allow continued service in the event of signaling point or link failures.

Figure 3:
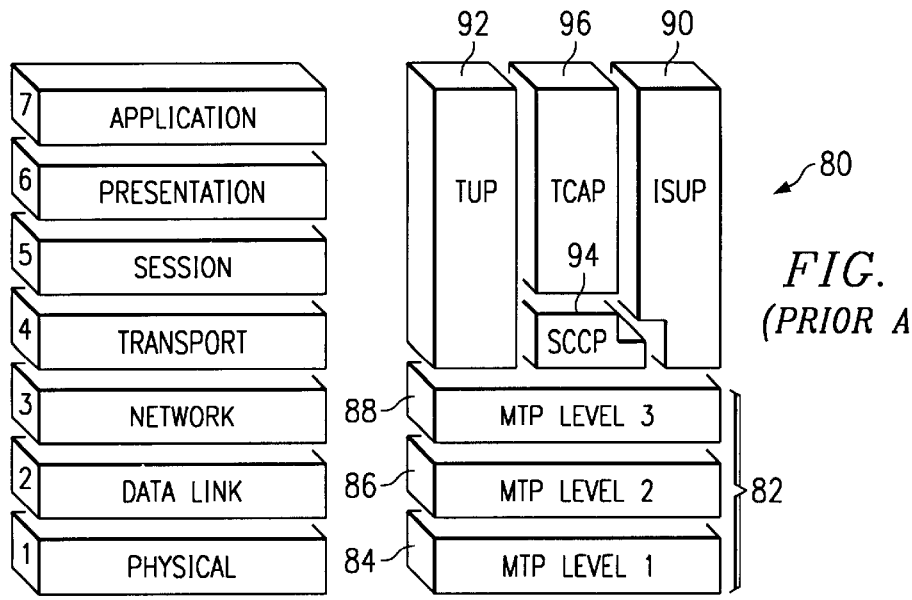
FIG. 3 illustrates an SS7 protocol stack of the prior art along side the OSI reference model.

With reference to FIG. 3, therein is shown the SS7 protocol stack 80 aside the OSI reference model. The message transfer part (MTP) layer 82 is divided into three levels. The lowest level, MTP level one 84 is equivalent to the OSI physical layer. MTP level one 84 defines the physical, electrical and functional characteristics of the digital signaling link.

Next, MTP level two 86 ensures accurate end-to-end transmission of a message across a signaling link. In essence, the MTP level two 86 implements flow control, message sequence validation and error checking so that when an error occurs on a signaling link, the message (or set of messages) is retransmitted. As indicated in FIG. 3 the MTP level two 86 is equivalent to the OSI data link layer.

The final layer of MTP 82, MTP level three 88 provides message routing between signaling points in the SS7 network. MTP level three 88 reroutes traffic away from failed links and controls traffic when congestion occurs. MTP level three 88 functions as the OSI network layer of the OSI reference model.

The ISUP layer 90 of the SS7 protocol stack 80 defines the protocol used to setup, manage and release trunk circuits that carry voice and data between terminating line exchanges, e.g., between a calling party and a called party. The ISUP layer 90 is used for both ISDN and non-ISDN calls. However, calls that are originate and terminate at the same switch do not use ISUP signaling.

The protocol stack 80 also includes a telephone user part (TUP) layer 92 which supports basic call setup and pair down functions in some parts of the world. The TUP layer 92 handles analog circuits only and in some countries, the ISUP layer 90 has been used to replace TUP layer 92 for call management.

A signal link connection control part (SCCP) 94 provides connection-less and connection-oriented network services and global title translation capabilities above the MTP level three 88. A global title is an address, e.g., a dialed 800 number, calling card number, or mobile subscriber identification number, which is translated by the SCCP layer 94 into a destination point code (DPC) and subsystem number. A subsystem number uniquely identifies an application at the base destination signaling point. The SCCP layer 94 is used as a transport layer for TCAP based services.

The final part of the SS7 protocol stack 80 includes the transaction capabilities application part (TCAP) 96 which supports the exchange of noncircuit related data between applications across the SS7 network 50 and the SCCP 94 connectionless service. As such, queries and responses sent between the SSP 56 and the SCP 70 are carried in a TCAP message. For example, an SSP 56 sends a TCAP query to determine the routing number associated with the dialed number and to check the personal identification number of a calling card user. In mobile networks (IS-41 and GSM), TCAP 96 carries mobile application part messages sent between mobile switches and data bases to support user authentication equipment identification and roaming.

Communication between a PLMN utilizing SS7 and an IP-based network utilizing protocols such as TCP/IP and UDP/IP, for example, requires a means for translating the signaling information between the two protocols. Prior art designs require a node or gateway in the IP network communicating with an MSC 30 to be manually configured, in order to translate IP port and address information to a format recognizable in SS7 protocol, and vice versa. Manual configuration is labor-intensive, time-consuming and costly. What is needed in the art is a method and system for automatically configuring a gateway translation function in a communications system internetworking an IP-based network with a PLMN.

Figure 4:
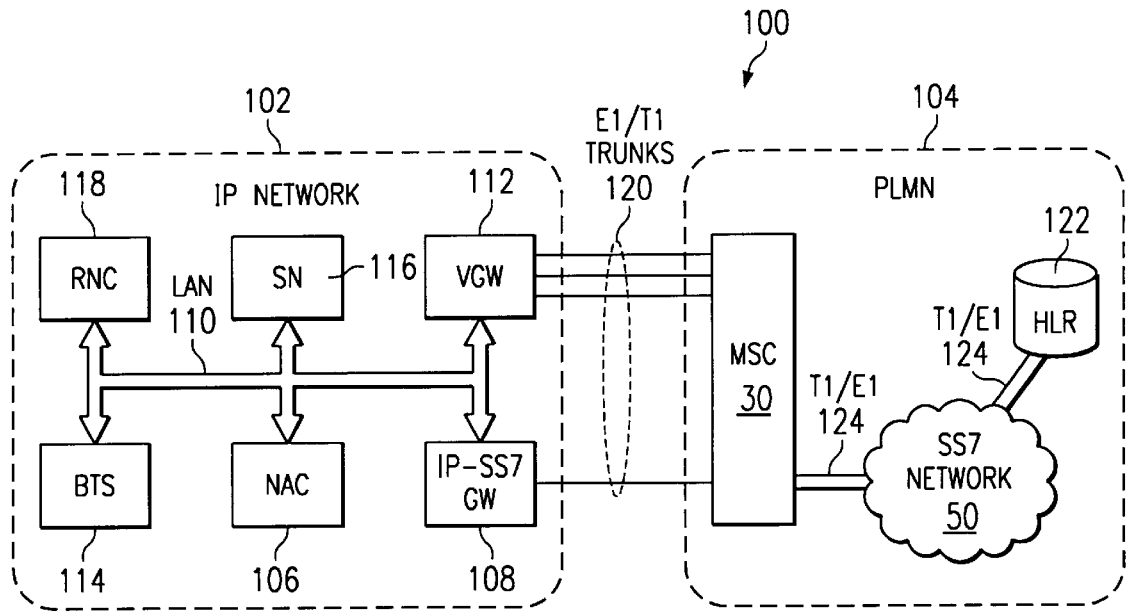
FIG. 4 shows a communication system of the present invention having an IP network in communication with a PLMN via an IP-SS7 gateway.

The present invention achieves technical advantages as a method and system for facilitating automatic translation of signals between a PLMN and an IP-based network. FIG. 4 illustrates a communications system 100 in accordance with the present invention having an IP network 102 in communication with a PLMN 104. Voice gateway 112 and IP-SS7 gateway 108 of IP network 102 are communicably coupled to MSC 30 of the PLMN 104 via a connection such as an E1 and/or T1 trunk 120, for example. Voice gateway 112 and IP-SS7 gateway 108 can communicate using IP signaling protocols such as TCP/UDP, for example, via a Local Area Network (LAN) 110 and with other elements and nodes coupled to the LAN 110, such as Service Node (SN) 116 handling various services, Base Transceiver Station (BTS) 114, and Radio Network Controller (RNC) 118 which controls BTSs 114. The LAN connection 110 may be an Ethernet connection 120, e.g. an IEEE 803.2 Ethernet, or other connection protocol. While the translation function of the present invention is described in connection with a LAN 110, it should be understood that other network topologies may be employed such as a Wide Area Network (WAN). In accordance with the present invention, Network Access Controller (NAC) 106 is coupled to the LAN 1 10 and is in communication with IP-SS7 gateway 108. In the IP network 102, destinations are identified by a port number and an IP address. The port numbers may be TCP, UDP, or other network layer port number information. The NAC 106 is configured to provision IP address and port number identifiers of the IP-SS7 gateway 108 within the NAC 106.

Within the PLMN 104, MSC 30 communicates with SS7 network 50, and a node or gateway (not shown) in the SS7 network 50 communicates with HLR 122 using Mobile Application Part (MAP) messages over T1 or E1 lines 124, for example. The MAP messages are sent using SS7 signaling and contain TCAP messages. Signaling within the PLMN 104 is usually routed in global title which comprises a numbering plan (NP) that identifies the type of numbering scheme, such as E.212 or E.214. The global title also includes a call number series (NS) which is a digit string typically representing the E.164 telephone number of the mobile station. A global title translation function within the PLMN 104 translates the NP and NS to a point code and subsystem number which identifies the node in the SS7 network 50 or PLMN 104. The global title translation function maps the telephone number to a particular HLR 122 where the mobile station is then registered.

Figure 5:
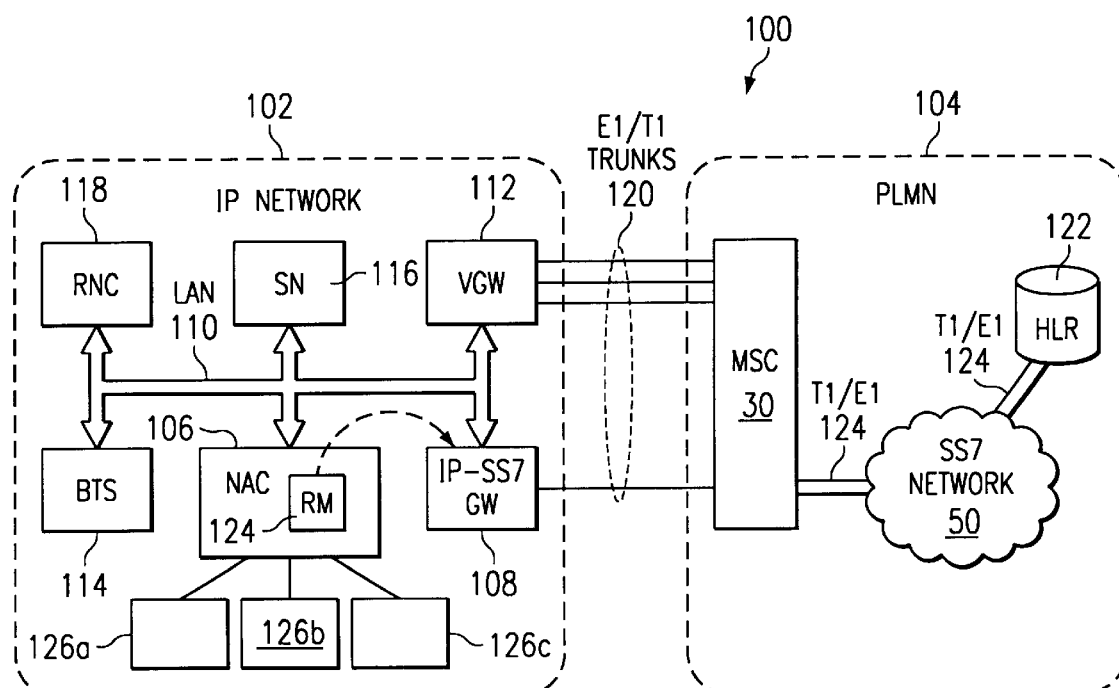
FIG. 5 illustrates a NAC of the present invention within the IP network servicing a plurality of subscribers, where the NAC creates and sends a registration message to the IP-SS7 gateway.

In FIG. 5 therein is shown a plurality of subscribers 126a, 126b and 126c coupled to and serviced by the NAC 106. The NAC 106 has a unique E.164 address, IP address and port number and is adapted to detect the presence of subscribers 126. The NAC 106 identifies the E.212 and E.214 numbers for the subscribers 126 and creates a Registration Message (RM) 124 containing the E.164, E.212, and E.213 addresses, IP address and port information. The registration message 124 is formatted into a message stream capable of being communicated over the LAN 110 to the IP-SS7 gateway 108.

Figures 6, 7:
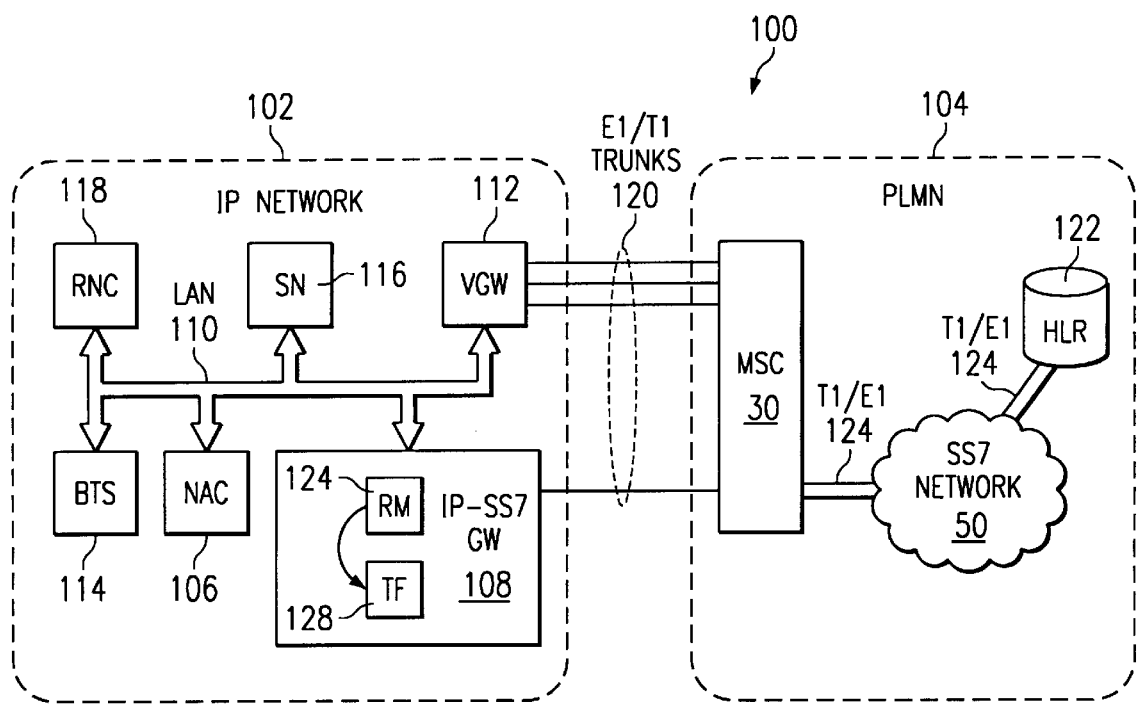
FIG. 6 illustrates the receipt of the registration message by the IP-SS7 gateway, which uses the information therein to update the translation function residing in the IP-SS7 gateway.
FIG. 7 is exemplary of the contents of registration message of the present invention.

FIG. 6 illustrates that the IP-SS7 gateway 108 comprises a translation function (TF) 128 that acts as a bridge between the PLMN 104 and IP network 102, allowing the mapping between the two networks. The IP-SS7 gateway 108 uses the information in the registration message 124 to update the translation function 128 contained in the IP-SS7 gateway 108. The translation function 128 translates the NP and NS to a TCP/UDP port and IP address. For example, an NP of E.164"and NS of 214 997 1234" is mapped to a particular TCP port "ppp" and IP address, "www.xxx.yyy.zzz."

In accordance with the present invention, the IP-SS7 gateway 108 updates its translation function 128 in order to provide call routing for subscribers of the NAC 106 to destinations within the PLMN 104 through the MSC 30. The translation function 128 of the IP-SS7 gateway 108 may utilize a translation table, or other similar data structure. Not only must the NAC 106 be configured and adapted to create registration messages 124, the IP-SS7 gateway 108 must also be configured and able to receive and interpret registration messages 124. The IP-SS7 gateway 108 must also be able to translate the information in the registration message 124 into a format capable of updating the translation function 128.

FIG. 7 illustrates the format of a registration message 124 according to one embodiment of the present invention as having a header 132 indicating that the following data stream is a registration message, and a length field 134 indicating the length of the data that follows. The registration message 124 also includes IP address and port identification 136, which may comprise IP addresses, network layer port numbers, and numbering plans and numbering series for E.164, E.212, and E.214 numbers. For example, the port number information may include TCP port numbers as shown, or UDP port numbers, or other network layer port numbers, depending on the protocol used. The registration message 124 may also include configuration parameters 138 and other management parameters required or useful to the translation function 128 of the IP-SS7 gateway 108.

For example, the addition of a timer may be required for supervision of the links and connections (not shown). The timer may be sent along with or may be as part of the registration message 124. Such a timer is required to detect a dropped connection and determine if a re-connection should be attempted. In particular, the timing information may designate a time-out period and frequency of receipt of messages. If a message has not been received in 3 seconds, then a connection may be re-established. Typical keep-alive timers of TCP/IP protocols are set for lengthy periods of time, such as an hour or so. In a real-time voice-over-IP system, such as the communications system 100 of the present invention, the keep-alive time period must be in the order of seconds. Other connection management and recovery mechanisms are anticipated as being useful for inclusion in the registration message 124 of the present invention.

Figure 8:
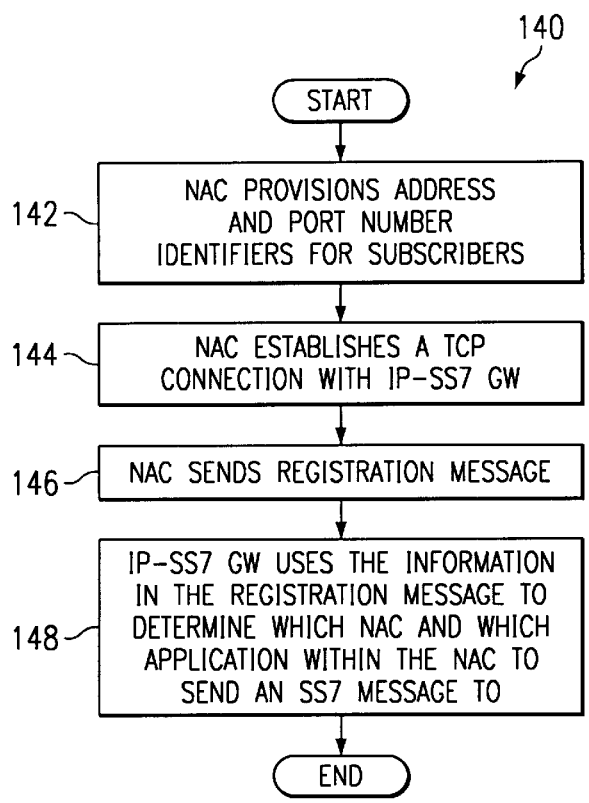
FIG. 8 shows a flow chart illustrating the steps of the method of an embodiment of the present invention.

FIG. 8 is a process flow diagram 140 for a method of facilitating automatic translation of signals between the NAC 106 and the IP-SS7 gateway 108. Either upon power-on of the system 100 or upon the addition of a new NAC 106 to the system, the NAC provisions IP address and port number identification identifiers for subscribers (step 142). The provisioning step 142 may include the NAC identifying address information of subscribers and formatting subscriber address information into the registration message. Next, the NAC 106 establishes a TCP/IP connection with the IP-SS7 gateway 108 (step 144). If UDP is used, step 144 is not required, because this protocol is connectionless. The NAC 106 then sends a registration message (step 146) to the IP-SS7 gateway 108 over the LAN 110. The IP-SS7 gateway 108 uses the information in the registration message 124 to determine which NAC 106 and which application within the NAC 106 to send an SS7 message to within the PLMN 104 (step 148). When an SS7 message is received from the PLMN 104, the IP-SS7 gateway 108 uses the translation function 128 to determine which NAC 106 the SS7 message should be routed to.

Figure 9:
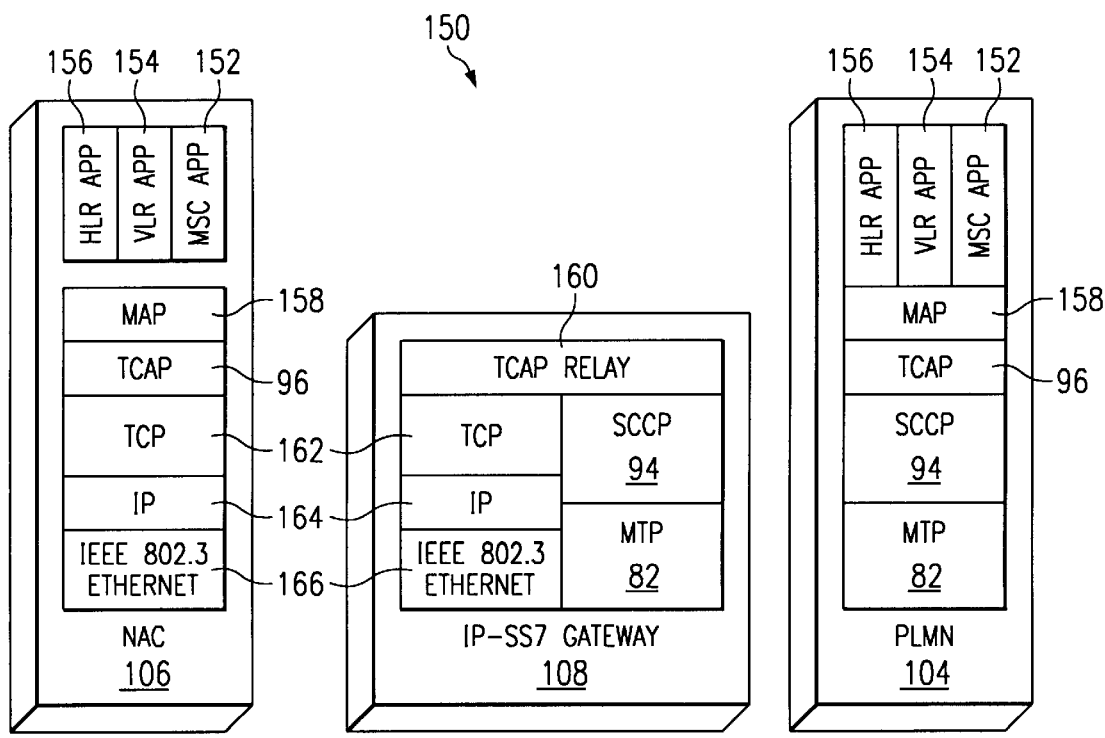
FIG. 9 shows a functional abstraction of the system elements: NAC, IPSS7 gateway, and PLMN involved in the signaling of the present invention.

FIG. 9 shows the functional abstraction of level stacks 150 of the system elements of the present invention, more particularly the NAC 106, the IP-SS7 gateway 108, and the PLMN 104. The IP-SS7 gateway 108 comprises a TCAP relay 160, correlating TCP 162, IP 164, and IEEE 802.3 Ethernet 166 information from the NAC 106 with SCCP 94 and MTP 82 information from the PLMN 104. MAP 158 and TCAP 96 messages reside in the stacks of both the NAC 106 and PLMN 104. The NAC 106 and PLMN 104 contain peer internetworking applications, for example, the MSC 152, VLR 154, and HLR 156 applications. The IP-SS7 gateway 108 provides the necessary functions to transport the GSM MAP signaling from the GSM system to the PLMN 104, and vice versa.

Each GSM application, for example MSC 152, VLR 154, and HLR 156, may be assigned a unique IP address and TCP port number combination. In addition, each GSM application is also assigned a unique E.164 number. The IP-SS7 gateway 108 has a translation function or table 128 to translate an E.164 number to an IP address and TCP port number combination. The IP-SS7 gateway 108 uses this translation function 128 upon receiving a GSM MAP message from the PLMN to determine which GSM application the message is destined for. For the HLR 156 application, each subscriber serviced by the HLR has a unique E.212 or E.214 number. These numbers are included in the translation table 128 of the IP-SS7 gateway, as well.

There are many advantages of the present method and system for automatically configuring translation functions of nodes in a communication system internetworking PLMN and IP networks. In particular with reference to the application described herein, an IP-SS7 gateway 108 may be automatically configured upon start-up or upon the addition of a new NAC 106, without operator intervention. The need to configure an IP-SS7 gateway manually is eliminated. This provides both a time savings and an operational cost savings. Furthermore, the possibility of introducing errors due to human error is avoided, with the automatic configuration of translation functions provided by the present invention. The system and method may be implemented by a NAC 106 upon system start-up, or when the NAC 106 is introduced into the communications system 100. The present invention is particularly advantageous with an HLR 122 application having many subscribers in the database.

While the invention has been described and shown with reference to preferred embodiments, it should be understood by those skilled in the art that various other changes in the form and details may be made without departing from the spirit and scope of the invention. For example, one IP-SS7 gateway 108 may support many NACs 106 in the system 100, and there may be a plurality of IP-SS7 gateways 108 in the system 100. Network layer protocols other than the TCP/UDP discussed herein may be used with the present invention. The present invention is operable in other wireless networks other than GSM, including 3G networks.

What is claimed is:

1. In a communications system comprising a Public Land Mobile Network (PLMN), an Internet Protocol (IP)-based network and a gateway providing an exchange mechanism between the PLMN and the IP-based network, the IP-based network containing a Network Access Controller (NAC) configured to communicate with said gateway, a method of facilitating automatic translation of signals between the PLMN and the IP-based network comprising the steps of:

provisioning IP address and port number identifiers of said gateway within said NAC; and responsive to a system startup, automatically sending a registration message from said NAC to said gateway, said registration message containing the IP address and port information of nodes within said IP-based network.

2. The method according to claim 1 wherein said exchange mechanism is a User Datagram Protocol (UDP) connection.

3. The method according to claim 1 further comprising the step of establishing a connection between said NAC and said gateway wherein said exchange mechanism is a Transmission Control Port/Internet Protocol (TCP/IP) connection.

4. The method according to claim 3 further comprising the step of utilizing a plurality of Mobile Switching Centers (MSCs) having common channel signaling system number 7 (SS7) to interconnect said MSCs, wherein said PLMN comprises a Global System for Mobile (GSM) network.

5. The method according to claim 4 wherein said gateway is an IP-SS7 gateway.

6. The method according to claim 5 further comprising the step of:

updating a translation function of said IP-SS7 gateway with said IP address and port identifiers in said registration message.

7. The method according to claim 6 wherein said translation function comprises a translation table.

8. The method according to claim 7 further comprising the step of:

said IP-SS7 gateway translating E.212, E.214, and E.164 numbers to said IP address and port identifiers.

9. The method according to claim 8 further comprising the steps of:

said IP-SS7 gateway receiving a GSM MAP message from said PLMN; and determining a destination GSM application for said GSM MAP message utilizing said translation table.

10. The method according to claim 9 wherein said registration message contains E.164, E.212 and E.214 numbers, IP addresses and port identifiers for a plurality of applications serviced by said NAC.

11. The method according to claim 10 wherein said registration message further comprises configuration information for said translation function.

12. The method according to claim 1 wherein said exchange mechanism is over a Local Area Network (LAN).

13. The method according to claim 1 wherein said exchange mechanism is over a Wide Area Network (WAN).

14. The method according to claim 1 further comprising the steps of:
said NAC identifying IP address information of said subscribers; and
formatting said subscriber IP address information into said registration message, wherein said NAC is configured to handle call control functions and services for a plurality of subscribers.

15. In a communications system comprising a Public Land Mobile Network (PLMN) in communication with an Internet Protocol (IP)-based network, a system for facilitating automatic translation of signals between the PLMN and the IP-based network comprising:
a gateway for providing an exchange mechanism between the PLMN and the IP-based network; and
a Network Access Controller (NAC) within the IP-based network for, responsive to a system startup, automatically providing signal control functions for a plurality of subscribers, said NAC configured to provision IP address and port number identifiers of said subscribers to said gateway and send a registration message from said NAC to said gateway, said registration message containing the IP address and port information of said subscribers.

16. The system according to claim 15 wherein said PLMN is a Global System for Mobile Communications (GSM) network comprising a plurality of Mobile Switching Centers (MSCs) utilizing common channel signaling system number 7 (SS7) to interconnect said MSCs, wherein said exchange mechanism is over a Local Area Network (LAN) and is a Transmission Control Port/Internet Protocol (TCP/IP) connection, wherein said NAC is further configured to establish a connection to said gateway.

17. The system according to claim 15 wherein said connection is over a Wide Area Network (WAN).

18. The system according to claim 15 wherein said gateway is an IP-SS7 gateway comprising a translation function and said IP address and port identifiers contained in said registration message are used to update said IP-SS7 gateway translation function.

19. The system according to claim 18 wherein said translation function comprises a translation table.

20. The system according to claim 19 wherein said registration message contains E.164, E.212, and E.214 numbers, IP address and port identifiers for a plurality of GSM applications serviced by said NAC.

21. The system according to claim 20 wherein said registration message further comprises configuration information for said translation function.

22. The system according to claim 15, wherein said NAC is configured to identify IF address information of said plurality of subscribers and format said subscriber IP address information into said registration message.

23. The system according to claim 15 wherein said exchange mechanism is a User Datagram Protocol (UDP) connection.

24. The method according to claim 1, further comprising:
responsive to adding a new NAC to said IP network, said IP network node addresses and port information contained in said NAC are sent in a registration message to said gateway.

25. The method according to claim 1, further comprising the step of updating the translation function in said gateway by correlating said IP address and port number information to a numbering plan and digit string within the PLMN.

* * * * *